(12) United States Patent
Subramanian et al.

(10) Patent No.: US 11,086,870 B1
(45) Date of Patent: Aug. 10, 2021

(54) MULTI-TABLE AGGREGATION THROUGH PARTIAL-GROUP-BY PROCESSING

(71) Applicant: Teradata US, Inc., Dayton, OH (US)

(72) Inventors: Anantha B. Subramanian, Bangalore (IN); Sanjay Nair, El Segundo, CA (US); Yi Xia, Rancho Palos Verdes, CA (US); Grace Kwan-On Au, Rancho Palos Verdes, CA (US); Kuorong Chiang, Buena Park, CA (US)

(73) Assignee: Teradata US, Inc., San Diego, CA (US)

( * ) Notice: Subject to any disclaimer, the term of this patent is extended or adjusted under 35 U.S.C. 154(b) by 308 days.

(21) Appl. No.: 14/985,117

(22) Filed: Dec. 30, 2015

(51) Int. Cl.
| | |
|---|---|
| *G06F 17/00* | (2019.01) |
| *G06F 16/2453* | (2019.01) |
| *G06F 16/242* | (2019.01) |
| *G06F 16/22* | (2019.01) |

(52) U.S. Cl.
CPC .... *G06F 16/24544* (2019.01); *G06F 16/2282* (2019.01); *G06F 16/244* (2019.01)

(58) Field of Classification Search
None
See application file for complete search history.

(56) References Cited

U.S. PATENT DOCUMENTS

| | | | | |
|---|---|---|---|---|
| 8,086,598 B1* | 12/2011 | Lamb | ............... | G06F 16/24544 707/714 |
| 2010/0030731 A1* | 2/2010 | Gui | ................... | G06F 17/30457 707/714 |
| 2013/0226959 A1* | 8/2013 | Dittrich | ............. | G06F 17/30312 707/769 |
| 2016/0170974 A1* | 6/2016 | Martinez Corria | ... | G06F 17/289 704/4 |

OTHER PUBLICATIONS

Baraglia et al. Document Similarity Self-Join with MapReduce. 2010. IEEE International Conference on Data Mining. (Year: 2010).*

* cited by examiner

*Primary Examiner* — Tuankhanh D Phan
(74) *Attorney, Agent, or Firm* — Randy L. Campbell, Jr.

(57) ABSTRACT

A data store system includes an array of persistent storage devices configured to store a plurality of data store tables. The data store system includes a processor in communication with the storage device. The processor may receive a query comprising an aggregate function and identify structure of an argument of the aggregate function. The subset of data store tables may be associated with the argument. The processor may partially-execute the aggregate function on each data store table in the subset involved in the argument of the aggregate function to create partially-executed results for each data store table of the subset of data store tables. The processor may join the partially-executed results based on join conditions contained in the aggregate function. The processor may complete execution of the aggregate function on the partially-executed results to generate a final result of the aggregate function. A method and computer-readable medium are also disclosed.

20 Claims, 5 Drawing Sheets

US 11,086,870 B1

MULTI-TABLE AGGREGATION THROUGH PARTIAL-GROUP-BY PROCESSING

BACKGROUND

Data stores systems, such as database and file systems, store vast amounts of logically related data in the form of data tables. Queries may be used to perform various utilities and analytics on the data tables to generate desired results. One such query type is an aggregate function, which aggregates multiple column values across one or more tables to generate a result. Such an aggregate function can include columns from multiple tables as input, which may require join conditions expressed in the query function used to perform the join of the tables in order to carry out the aggregate determination. The query containing the aggregate function may also express multi-table grouping conditions. The use of multi-table join and grouping conditions adds a layer of complexity in order to execute the aggregate function. Joining the tables, while maintaining these conditions, may require massive amounts of rows to be maintained during the aggregate function result determination, which results in heavy resource usage.

Systems may use various manners to evaluate multi-table aggregate functions. One such manner is to rewrite the query to use derived tables that push aggregation prior to the join. However the problem with this approach is that, if the grouping expression of the partial aggregation is highly unique, pushing aggregation would not assist in reducing the number of rows that the joins would need to process, but instead would also significantly slow the performance instead of providing benefits. Thus, a more efficient manner of processing the multi-table aggregate functions is to use multi-table partial-group-by (PGB) processing under particular conditions.

SUMMARY

According to one aspect of the present disclosure, a data store system may include an array of persistent storage devices configured to store a plurality of data store tables. The data store system may further include a processor in communication with the storage device. The processor may receive a query comprising an aggregate function. The processor may identify structure of an argument of the aggregate function. The subset of data store tables may be associated with the argument. The processor may partially execute the aggregate function on each data store table in the subset involved in the argument of the aggregate function to create partially-executed results for each data store table of the subset of data store tables. The processor may join the partially-executed results based on join conditions contained in the partial-group-by aggregate function. The processor may complete execution of the aggregate function on the partially-executed results to generate a final result of the partial-group-by aggregate function.

According to another aspect of the present disclosure, a method may include receiving a query comprising an aggregate function. The aggregate function may perform at least one aggregate function on a subset of data store tables stored on one or more persistent storage device. The method may further include identifying structure of an argument of the aggregate function. The subset of data store tables may be associated with the argument. The method may further include partially-executing the aggregate function on each data store table in the subset involved in the argument of the aggregate function to create partially-executed results for each data store table of the subset of data store tables. The method may further include joining the partially-executed results based on join conditions contained in the aggregate function. The method may further include completing execution of the aggregate function on the partially-executed results to generate a final result of the aggregate function.

According to another aspect of the present disclosure, a computer-readable medium may be encoded with a plurality of instructions executable by a processor. The plurality of instructions may include instructions to receive a query comprising an aggregate function. The aggregate function is configured to perform at least one aggregate function on a subset of data store tables stored on one or more persistent storage devices. The plurality of instructions may further include instructions to identify structure of an argument of the aggregate function. A subset of data store tables may be associated with the argument. The plurality of instructions may further include instructions to partially-execute the aggregate function on each data store table in the subset involved in the argument of the aggregate function to create partially-executed results for each data store table of the subset of data store tables. The plurality of instructions may further include instructions to join the partially-executed results based on join conditions contained in the aggregate function. The plurality of instructions may further include instructions to complete execution of the aggregate function on the partially-executed results to generate a final result of the aggregate function.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
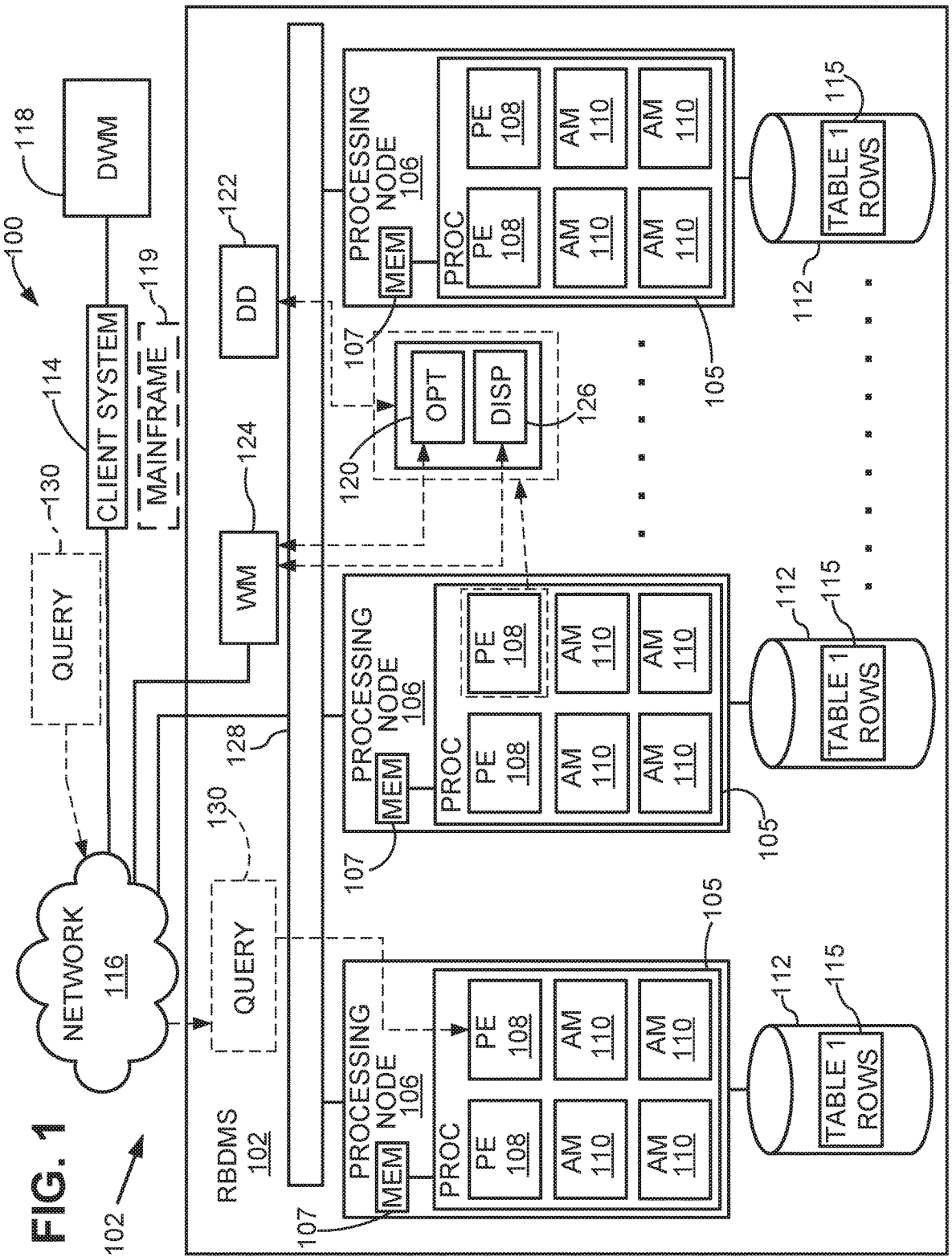
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the module includes the portion of the memory that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
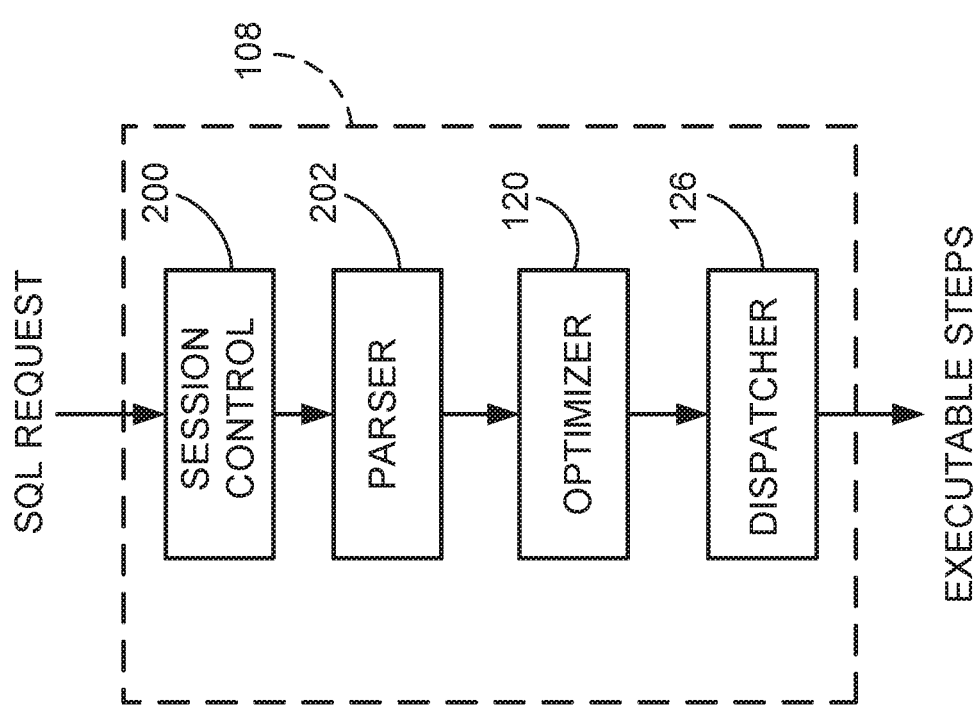
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
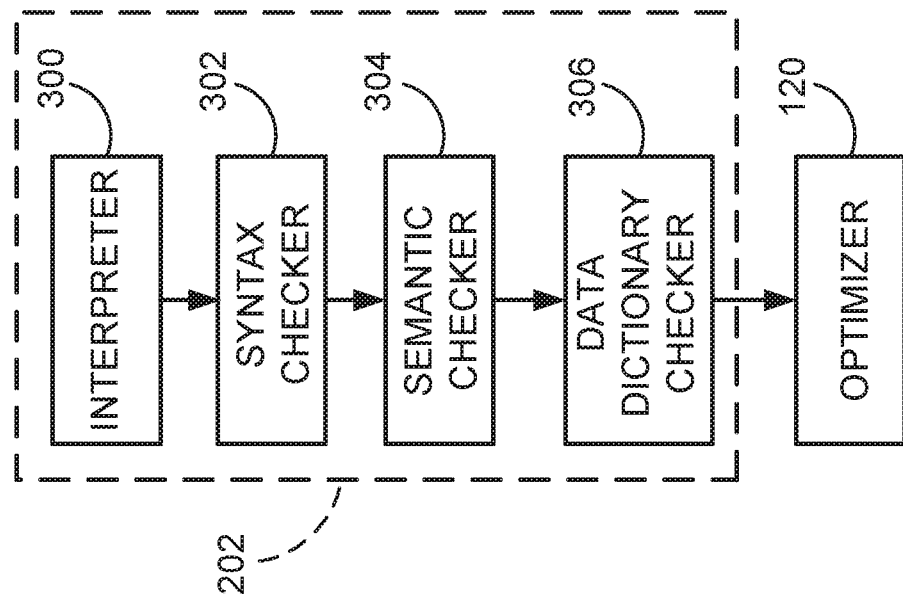
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

During operation, a query, such as the query 130, may contain a multi-table aggregation. The RDBMS 102 may inspect the query 130 to determine the contents and determine how to optimally execute the query. In one example, the query 130 may contain a multi-table aggregate function. Such an aggregate function may contain an argument that references more than one table and the query 130 may have join and/or grouping conditions that span multiple tables as well. The RDBMS 102 may identify such an aggregate function and evaluate how it may be processed in pursuit of optimal execution of the aggregate function.

Figure 4:
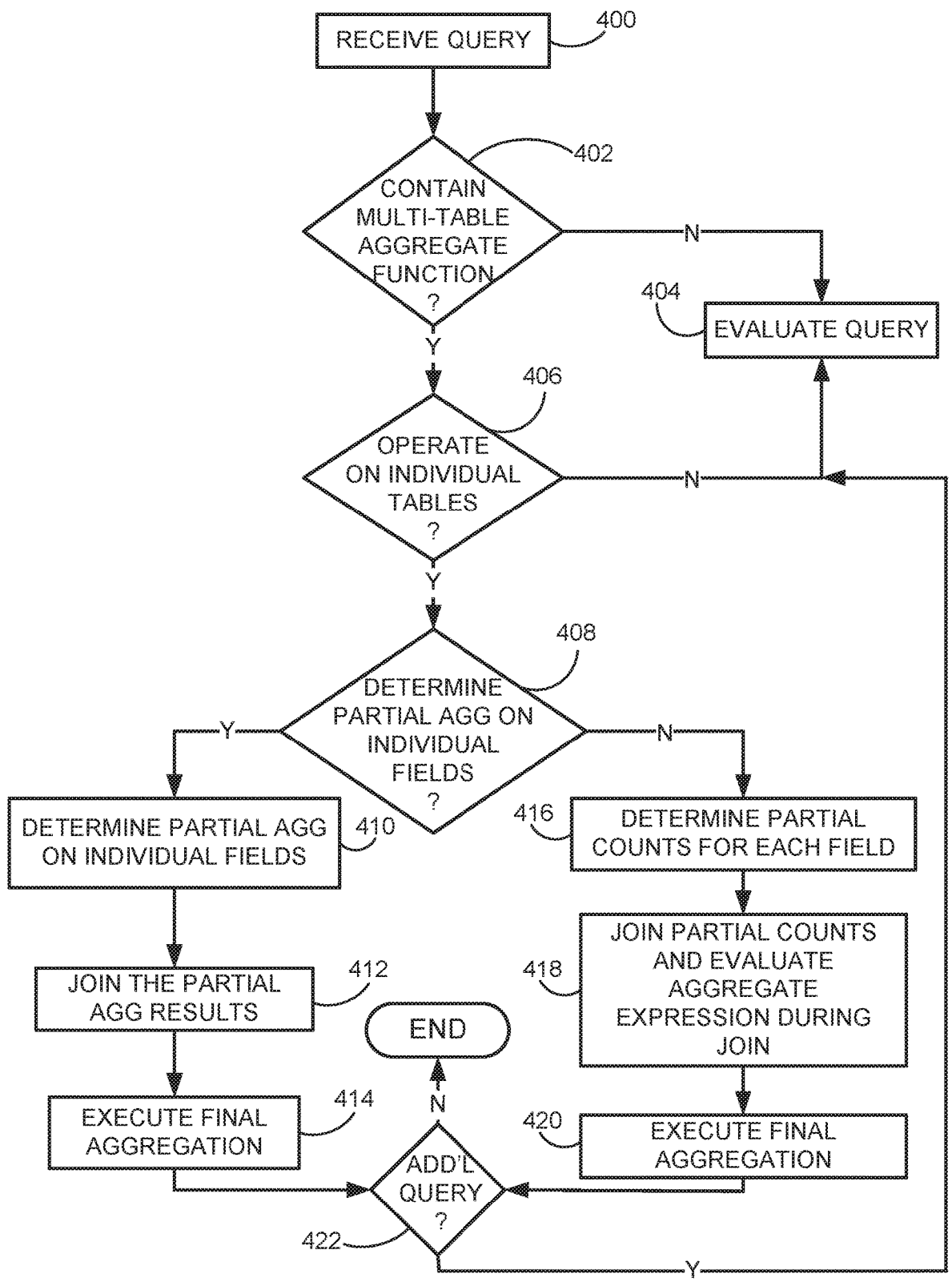
FIG. 4 is an operational flow diagram of example operation of a database system for a multi-table aggregate function.

FIG. 4 is an operational flow diagram of the RDBMS 102 during processing of a multi-table aggregate function. In one example, the RDBMS 102 may receive a query 130 (400). The RDBMS 102 may determine if the query 130 contains a multi-table aggregate function (402). If no multi-table aggregate function is contained in the query 130, the RDMBS 102 may evaluate the query 130 in accordance with its contents, which, in one example, may include planning and execution (404). If the query 130 does contain a multi-table aggregate function, the RDBMS 102 may determine if a multi-table partial-group-by (PGB) optimization is applicable whereby PGB operations are to be executed on individual tables prior to any join being performed (406). In one example, this may be a cost-based optimization analysis performed by the optimizer 120 to determine if such a manner of execution would provide optimal results across various factors such as time, resource usage, and other factors contributing to appropriate query planning. If the RDBMS 102 determines that applying PGB operations on the tables individually does not offer a better query plan, the RDMBS 102 may execute the multi-table aggregate in another manner (404).

If the RDBMS 102 determines that applying PGB operations on the tables individually would provide a better query plan, the RDBMS 102 may determine if partial aggregate results may be determined on the individual table fields involved in the multi-table aggregate function (408). If so, the RDBMS 102 may determine partial aggregate results on the individual table fields in the argument of the multi-table aggregate function, while maintaining any grouping conditions across the partial results (410). In one example, whereby an argument of the multi-table aggregate function is the multiplication of individual table fields, the results may be determined and maintained according to the respective grouping conditions expressed in the query 130. The RDBMS 102 may then join the partial aggregate results based on the join conditions expressed in the query (412). The RDBMS 102 may then execute a final aggregation on the joined partial aggregate results according to the argument of the multi-table aggregate function (414). In another example, whereby an argument of the multi-table aggregate function is the addition or subtraction of individual table fields, both a partial aggregate result and a partial count will be maintained for each group during PGB of the individual tables. The RDBMS 102 may then augment the original argument of the multi-table aggregate function with the partial count to generate the final aggregation results.

If the RDBMS 102 determines that partial aggregate results may not be determined on the individual fields involved in the multi-table aggregate function (408), the RDBMS 102 may determine partial counts for each table field involved in the argument of the multi-table aggregate function (416). In this case, PGB operations on individual tables will be based on respective fields from the grouping conditions and join conditions specified in the query 130 and the respective field from the argument of the multi-table aggregate function. The RDBMS 102 may join the partial counts results based on the join conditions expressed in the query 130. (418). Once all joins are complete, the RDBMS 102 may execute a final aggregation on the combined partial counts according to the argument of the multi-table aggregate function (420). Once final results are generated at either (414) or (418), the RDBMS 102 may determine if additional parts of the query require execution (422). In such an instance, the query execution may continue (404). If no further execution is required, the operations may end.

Figure 5:
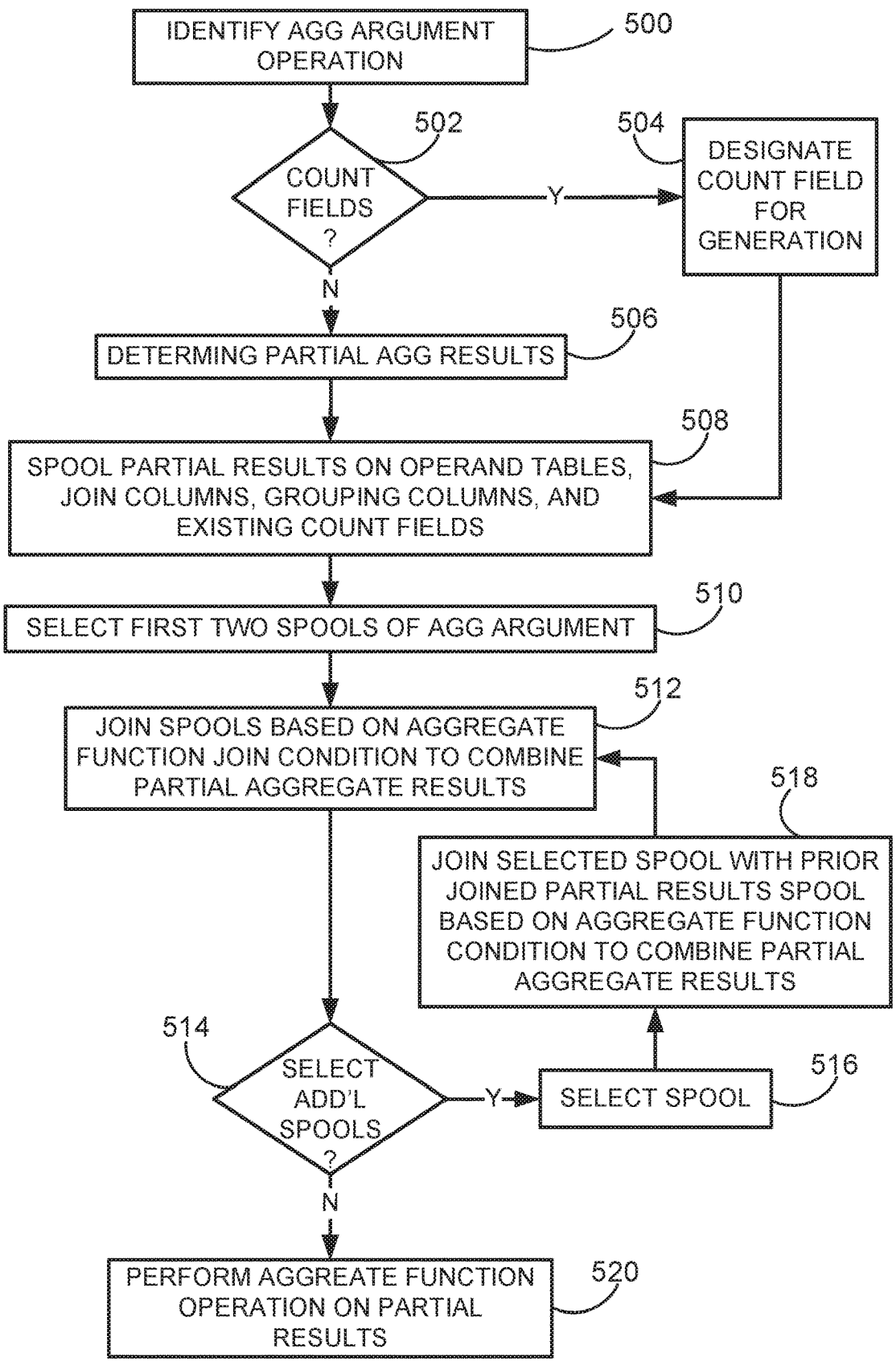
FIG. 5 is an operational flow diagram of example operation of a database system during processing of a multi-table aggregate function having partially-determinable results.

FIG. 5 is an operational flow diagram of the RDBMS 102 during evaluation of an identified multi-table aggregate function in which partial aggregate results may be determined. In one example, the RDBMS 102 may determine operations contained in the argument of the multi-table PGB aggregate function (500). Once the operations are determined, the RDBMS 102 may determine if count fields are to be generated (502). For example, depending on the types of operations in the multi-table aggregate function argument, determined at (500) a count field may be used, which allows qualified rows having common values to be reduced to a single row with the count field indicating how many actual rows contain those common values. In one example, the count fields may be part of spools generated for each table involved in the multi-table aggregate function used to maintain intermediate values prior to determination of the final result of the multi-table aggregate function. If a count field is to be used, the RDBMS 102 may designate a count field to be created (504).

Once the count field determination is made, the RDBMS 102 may determine partial results on the operand tables in the multi-table aggregate function while maintaining respective grouping conditions (506). In particular, the RDBMS 102 may determine single-table results for the aggregate function while maintaining any grouping conditions expressed in the multi-table PGB aggregate function, as well as any join conditions, such as join column values. For each column referenced in the multi-table aggregate function, a spool may be generated by the RDBMS 102 to maintain the partial results, join conditions, and grouping conditions (508). In scenarios involving count fields, each respective count field may be part of the spool maintaining the partial results. Once the spools are generated, the RDBMS 102 may select two spools from the argument of the multi-table aggregate function according the join conditions of the multi-table aggregate function (510). In one example, the spools may be selected based on a cost-analysis, which in one example, is performed by the optimizer 120.

The RDBMS 102 may join two spools from the argument of the multi-table aggregate function according the join conditions of the multi-table aggregate function to create a single spool of joined results (512). The single spool may join with other spools if additional join conditions exist. Once the join is complete, the RDBMS 102 may determine if selection of additional spools is to occur (514) that may have been created at (508). If so, one of the additional spools may be selected (516) and joined with the resultant spool of the preceding join according to the join conditions (518). Selection of the additional spool may be performed in a manner consistent with the selection at (510) or some other manner. In such a scenario, the prior join results may be spooled in another single spool and combined with the spool of partial aggregate results and associated column values of the selected additional spool (518). The RDBMS 102 may continue joining additional spools in this manner until no additional tables are determined to be referenced in the multi-table aggregate function. Once all joins are complete, the final results of the aggregate function may be performed, which includes execution of the operations in the argument of the multi-table aggregate function (520).

An example of a multi-table aggregate function that may be determined on the tables according to the operational flow diagram of FIG. 5 may be expressed as:

SELECT SUM ($A1*A2$) FROM $T1,T2$ WHERE
$b1=b2$ GROUP BY $c1,c2$, where table T1 and T2 may be defined by:

$T1(A1$ INTEGER,$B1$ INTEGER,$C1$ INTEGER); and $T2(A2$ INTEGER,$B2$ INTEGER,$C2$ INTEGER).

In the example function, the sum of the product of columns A1 and A2 is to be found under the constraints of the join condition, b1=b2, and the grouping conditions, values c1 and c2 of columns C1 and C2, respectively. The RDBMS 102 may determine that the multiplicative operation of the aggregate function argument, A1*A2, does not require a count field due to the nature of the operation. The RDBMS 102 may then determine partial results on the operand tables according to the grouping columns. In this example, the RDBMS 102 may generate a spool for each partial aggregate result, which would be SUM(A1) and SUM(A2), while maintaining the join and grouping conditions. The join columns expressed in the query 130 may be used as additional grouping columns for the partial aggregate result. Thus, the spool of table T1 would contain SUM(A1) grouped by columns B1 and C1 resulting in a SUM(a1) value for every unique combination of b1, c1. Similarly, a spool for T2 would contain SUM(A2) grouped by columns B2 and C2 resulting in a SUM(a2) value for every unique combination of b2, c2. Once the partial aggregate results are generated, since only two tables are involved, the RDBMS 102 may join the partial results based on the join condition, b1=b2, and generate the SUM(A1)*SUM(A2) for the relevant rows contained in the spools and grouped by c1 and c2.

Regarding tables T1 and T2, another example multi-table aggregate function may be expressed as:

SELECT SUM ($A1+A2$) FROM $T1,T2$ WHERE
$b1=b2$ GROUP BY $c1,c2$

This statement is identical to the previous example except for a sum on the result of adding A1 and A2 values instead of the product. An addition operation may be an operation that implements a count field since the qualified rows having common values associated with the multi-table aggregate function may be reduced to a single row in a spool with the count field representing the number of fields having common values, thereby, reducing system resource usage. For each table, spools may be generated. The nature of the operation requires only partial sums be generated for each table T1 and T2. Thus, a first spool will contain SUM(A1) for each row containing both values b1 and c1, as well as the count field which indicates the number of occurrences of the row, referred to as partial sum "S1". A second spool will contain SUM(A2) for each row containing both values b2 and c2, as well as the count field which indicates the number of occurrences of the row, referred to as partial sum "S2". Once the partial aggregate results are generated, the RDBMS 102 may join the spools based on the join condition b1, b2 and the final result may be generated, which includes groupings according to the grouping conditions. The final result may incorporate the count fields as multipliers for each respective value of S1 and S2, such that the final sum may be found as:

$S1*count\_field\_T1+S2*count\_field\_T2$ where count_field_T1 and count_field_T2 are the count fields associated with tables T1 and T2, respectively. In other examples, the partial aggregations on multi-table aggregate functions may be determined on other mathematical operations such as division and subtraction.

Figure 6:
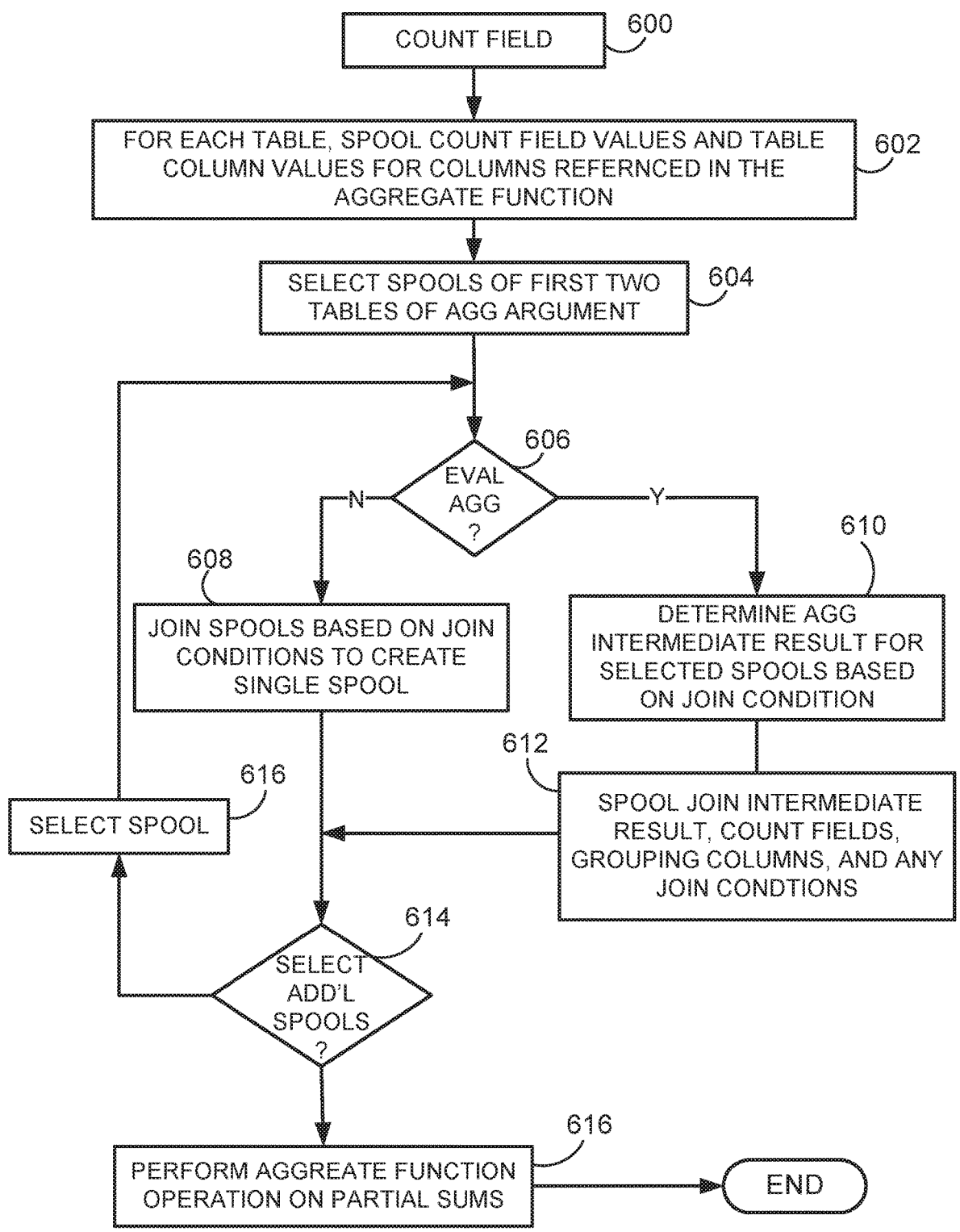
FIG. 6 is another operational flow diagram of example operation of a database system during processing of a multi-table aggregate function having partially-determinable results.

FIG. 6 is an operational flow diagram of the RDBMS 102 during evaluation of an identified multi-table aggregate function in which a materialization of subexpressions during a partial aggregation phase cannot be performed. Once the RDBMS 102 recognizes that a multiple-table aggregate function is to be processed without partial aggregate values, the RDBMS 102 may determine count field values to be generated for each table involved in the multi-table aggregate function (600), which represents the number of qualified rows that include common values of the column of a table involved in the argument of the multi-table aggregate function, join condition values, and grouping condition values. The RDBMS 102 may generate a spool for each table with each spool including rows that contain values of the multi-table aggregate function operand column(s) of the table, any join column values, and any grouping column values, as well as the count field (602).

The RDBMS 102 may select the first two spools of the argument of the multi-table aggregate function (604). In some examples, the argument of the multi-table aggregate function may be partially determinable based on the particular structure of the argument. The RDBMS 102 may determine if the multi-table aggregate function is determinable for the operand columns of the selected spools (606). If no such determination can be made, the RDBMS 102 may join the selected spools based on any relevant join conditions to create a single spool that includes operand columns of the selected spools, join column values, if needed, grouping column values, and count fields (608). If the multi-table aggregate function is partially determinable using the selected spools, the RDBMS 102 may determine the partial aggregate to produce an intermediate result for the selected spools (610). The RDBMS 102 may spool join intermediate result, count fields, grouping column values and any join condition values (612) to form an intermediate spool.

Upon joining the selected spools with or without occurrence of partial aggregate function determination, the RDBMS 102 may determine if selection of additional spools is to occur (614) that may have been created at (602). If so, one of the additional spools may be selected (616) and the RDBMS 102 may determine if the multi-table aggregate function is determinable for the operand columns of the selected spools (606). Selection of the additional spool may be performed in a manner consistent with the selection at (604) or some other manner. If the multi-table aggregate function is determinable for the operand columns of the selected spools, the RDBMS 102 may determine a partial aggregate result (610) and join the spools to create a partial aggregates results spool (612). If not, the spools may be joined based on the join conditions to create a single spool holding both the intermediate result column values and the operand column values of the newly selected spool (608). If no additional spool exists (614), the RDBMS 102 may perform the aggregate function on the relevant values of a final joined spool to generate the result of the aggregate function according the group by expression (616).

An example multi-table aggregate function that may be evaluated according to FIG. 6 may be:

SELECT SUM(case when $a1=a2$ then 1 else 2 end)
FROM $T1,T2$ ... WHERE $b1=b2$ GROUP BY
$c1,c2$.

In this example, the RDBMS 102 may determine that partial aggregate results cannot be found for each table due to nature of the argument of the aggregate function, "(case when a1=a2 then 1 else 2 end)". Once such a determination is made, the RDBMS 102 may determine that count fields are required for both tables T1 and T2. The RDBMS 102 may then generate a spool for each table T1 and T2 containing qualified rows and count fields. For table T1, a spool may be generated containing each row that commonly contains value a1 in column A1, join condition of column B1, the grouping condition of column C1, and the count field value. The spool may be grouped by a1, B1, and C1. Similarly, a spool for T2 may contain value a2 in column A2, join condition column B2, the grouping condition of column C2, and the count field value. The spool may be grouped by a2, b2, and c2. The RDBMS 102 may then join the two spools while evaluating the argument expression of "case when a1=a2 then 1 else 2 end". An intermediate spool may be generated that contains each row matching the join conditions multiplied by the respective count fields, as well as the grouping columns. Thus, the intermediate spool for this example would include a spool having a column of rows representing an intermediate result, where each row includes:

(case when ($a1=a2$) then 1 else 2 end)*(count value
of $T1$ spool*count value of $T2$ spool), as well as columns for each of the grouping columns C1, C2. From this spool, the final SUM result may be found for the values in the intermediate results column.

The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

We claim:

1. A data store system comprising:
   an array of persistent storage devices configured to store a plurality of data store tables;
   a processor in communication with the storage device, the processor configured to: receive a query comprising an aggregate function;
   identify structure of an argument of the aggregate function, wherein a subset of data store tables is associated with the argument, and wherein the subset comprises more than one data store table;
   partially-execute the aggregate function on each data store table in the subset involved in the argument of the aggregate function to create partially-executed results for each data store table of the subset of data store tables, wherein the partial execution comprises performance of an operation of the aggregate function on the subset of data store tables separately from one another;
   join the results of the partial execution based on join conditions contained in the aggregate function;
   complete execution of the aggregate function on the results to generate a final result of the aggregate function as at least a portion of execution of the query.

2. The data store system of claim 1, wherein the processor is further configured to identify the argument of the aggregate function to include partially-determinable aggregates based on the structure of the argument.

3. The data store system of claim 2, wherein the processor is further configured to:
   determine a partial aggregate result associated with each of the subset of data store tables; and
   generate a respective spool for each of the subset of data store tables, wherein, each spool comprises each partial aggregate result associated with a respective data store table from the plurality of data store tables, at join condition column, and a grouping condition, column.

4. The data store system of claim 3, wherein the processor is further configured to join the respective spool based on the join conditions contained in the aggregate function to produce a final result of the aggregate function.

5. The data store system of claim 1, wherein the processor is further configured to determine that partial aggregate results are incapable of being generated from the argument of the aggregate function.

6. The data store system of claim 5, wherein the processor is further configured to generate a respective spool for each data store table of the subset of data store tables, wherein each respective spool contains a plurality of rows, wherein each row comprises each unique combination of a column value of the partial aggregate argument, a value of a join column, and a value of a grouping column in a respective data store table, and a count value indicative of a number of rows in the associated data store table having the unique combination.

7. The data store system of claim 6, wherein the processor is further configured to join the respective spools to, generate the final result of the aggregate function.

8. A method comprising:
   receiving a query comprising an aggregate function, wherein the aggregate function is configured to perform at least one aggregate function on a subset of data store tables stored on one or more persistent storage devices;
   identifying structure of an argument of the aggregate function, wherein a subset of data store tables is associated with the argument, and wherein the subset comprises more than one data store table;
   partially-executing the aggregate function on each data store table in the subset involved in the argument of the aggregate function to create partially-executed results for each data store table of the subset of data store tables, wherein the partial execution comprises performance of an operation of the aggregate function on the subset of data store tables separately from one another;
   joining the results of the partial execution based on join conditions contained in the aggregate function; and
   completing execution of the aggregate function on the results to generate a final result of the aggregate function as at least a portion of execution of the query.

9. The method of claim 8, further comprising identifying the argument of the aggregate function as including partially-determinable aggregates based on the structure of the argument.

10. The method claim 9, further comprising:
    determining a partial aggregate result associated with each of the subset of data store tables; and
    generating a respective spool for each of the subset of data store tables, wherein, each spool comprises each partial aggregate result associated with a respective data store table from the plurality of data store tables, at join condition column, and a grouping condition column.

11. The method of claim 10, further comprising joining the respective spool based on the join conditions contained in the aggregate function to produce a final result of the aggregate function.

12. The method of claim 8, further comprising determining that partial aggregate results are incapable of being generated from the argument of the aggregate function.

13. The method of claim 12, further comprising generating a respective spool for each data store table of the subset of data store tables, wherein each respective spool contains a plurality of rows, wherein each row comprises each unique combination of a column value of the partial aggregate argument, a value of a join column, and, a value of a grouping column in a respective data store table, and a count value indicative of a number of rows in the associated data store table having the unique combination.

14. The method of claim 13, further comprising joining the respective spools to generate the final result of the aggregate function.

15. A non-transitory computer-readable medium encoded with a plurality of instruction executable by a processor, the plurality of instructions comprising:
    instructions to receive a query comprising an aggregate function, wherein the aggregate function is configured to perform at least one aggregate function on a subset of data store tables stored on one or more persistent storage devices;
    instructions to identify structure of an argument of the aggregate function, wherein a subset of data store tables is associated with the argument, and wherein the subset comprises more than one data store table;

instructions to partially-execute the aggregate function on each data store table in the subset involved in the argument of the aggregate function to create partially executed results for each data store table of the subset of data store tables, wherein the partial execution comprises performance of an operation of the aggregate function on the subset of data store tables separately from one another;

instructions to join the results of the partial execution based on jot conditions contained in the aggregate function; and instructions to complete execution of the aggregate function on the partially-executed results to generate a final result of the aggregate function as at least a portion of execution of the query.

16. The non-transitory computer-readable medium of claim 15, wherein the plurality of instructions further comprises instructions to identify the argument of the aggregate function as including partially-determinable aggregates based on the structure of the argument.

17. The non-transitory computer-readable medium of claim 16, wherein the plurality of instructions further comprises;

instructions to determine a partial aggregate result associated with each of the subset of data store tables; and instructions to generate a respective spool for each of the subset of data store tables wherein, each spool comprises each partial aggregate result associated with a respective data store table from the plurality of data store tables, at join condition column, and a grouping condition column.

18. The non-transitory computer-readable medium of claim 17, wherein the plurality of instructions further comprises instructions to join the respective spool based on the join conditions contained in the aggregate function to produce a final result of the aggregate function.

19. The non-transitory computer-readable medium of claim 18, wherein the plurality of instructions father comprises instructions to determine that partial aggregate results are incapable of being generated from the argument of the aggregate function.

20. The non-transitory computer-readable medium of claim 18, wherein the plurality of instructions further comprises instructions to generate a respective spool for each data store table of the subset of data store tables, wherein each respective spool contains a plurality of rows, wherein each row comprises each unique combination of a column value of the partial aggregate argument, a value of a join column, and a value of a grouping column in a respective data store table, and a count value indicative of a number of rows in the associated data store table having the unique combination; and instructions to join the respective spools to generate the final result of the aggregate function.

* * * * *